(12) United States Patent
Ghim et al.

(10) Patent No.: US 11,486,700 B2
(45) Date of Patent: Nov. 1, 2022

(54) SYSTEM AND METHOD FOR 3D SHAPE MEASUREMENT OF FREEFORM SURFACE BASED ON HIGH-SPEED DEFLECTOMETRY USING COMPOSITE PATTERNS

(71) Applicant: Korea Research Institute of Standards and Science, Daejeon (KR)

(72) Inventors: Young-Sik Ghim, Sejong-si (KR); The Manh Nguyen, Daejeon (KR); Hyug-Gyo Rhee, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 69 days.

(21) Appl. No.: 16/651,792

(22) PCT Filed: Jul. 29, 2019

(86) PCT No.: PCT/KR2019/009392
§ 371 (c)(1),
(2) Date: Mar. 27, 2020

(87) PCT Pub. No.: WO2021/020603
PCT Pub. Date: Feb. 4, 2021

(65) Prior Publication Data
US 2021/0404797 A1     Dec. 30, 2021

(51) Int. Cl.
*G01B 11/30* (2006.01)
*G01B 11/25* (2006.01)
(52) U.S. Cl.
CPC .................. *G01B 11/2513* (2013.01)

(58) Field of Classification Search
CPC ............ G01B 11/2513; G01B 11/2518; G01B 11/2527; G01B 11/2531; G01B 11/254; G01B 11/2545
See application file for complete search history.

(56) References Cited

U.S. PATENT DOCUMENTS

| 2010/0008588 | A1* | 1/2010 | Feldkhun | G01B 11/2527 382/206 |
| 2010/0296104 | A1* | 11/2010 | Abramovich | G01B 11/2527 356/601 |
| 2019/0368860 | A1* | 12/2019 | Yan | H04L 27/233 |
| 2020/0020119 | A1* | 1/2020 | Hayashi | G06T 7/514 |

* cited by examiner

*Primary Examiner* — Thai Q Tran
*Assistant Examiner* — Jose M Mesa
(74) *Attorney, Agent, or Firm* — Hoffmann & Baron, LLP

(57) ABSTRACT

The present disclosure is related to a system and a method for 3D shape measurement of a freeform surface based on high-speed deflectometry using composite patterns. More particularly, a system for profile measurement based on high-speed deflectometry using composite patterns includes: a composite pattern generation part to project a composite pattern generated by synthesizing patterns having different frequencies to a measurement object; a detector to acquire images of a deformed composite pattern reflected from the measurement object; and a phase acquisition part to acquire wrapped phases by each frequency from the composite pattern and unwrapped phases from the respective wrapped phases.

16 Claims, 10 Drawing Sheets

COMPOSITE PATTERN GENERATED BY SYNTHESIZING 4 OR MORE DIFFERENT PATTERNS

SYSTEM AND METHOD FOR 3D SHAPE MEASUREMENT OF FREEFORM SURFACE BASED ON HIGH-SPEED DEFLECTOMETRY USING COMPOSITE PATTERNS

CROSS-REFERENCE TO RELATED APPLICATIONS

This application is the U.S. National Phase of International Patent Application No. PCT/KR2019/009392, filed on 29 Jul. 2019, the contents of which are incorporated herein by reference in their entirety.

BACKGROUND

Technical Field

The present disclosure is related to a system and a method for 3D shape measurement of a freeform surface based on high-speed deflectometry using composite patterns.

Related Art

A freeform surface refers to any of surfaces which have the asymmetry against a certain axis. Key components of high-tech optical instruments, such as smartglasses, a head mounted display (HMD), etc., are composed of freeform surfaces. Since these freeform surfaces exceed the limits of the optical performance of conventional optical systems composed of either a spherical surface or an aspherical surface, concurrently with satisfying the need of design elements, they have been studied actively all around the world. The deflectometry, as a representative technology capable of measuring a 3 dimensional (3D) shape, is able to measure the 3D shape without a separate reference plane, being different from conventional interferometers. Thus, it has been in the limelight as the next generation system for 3D measurement of freeform surfaces.

The main principal of the deflectometry is to allow a stripe pattern having a periodic pattern to be incident to the surface of a measurement object, and to analyze a phase of the pattern deformed according to the shape of the measurement object, so as to measure changes in the slope of each surface. That is, measurement values obtained through the deflectometry are, according to the incident direction of the pattern, a slope component in the X direction ($\partial z/\partial x$) and a slope component in a Y-direction ($\partial z/\partial y$), respectively with the proviso that the shape of an object to be measured is $z=z(x,y)$. Thus, as integrating the two slope components in the respective X- and Y-directions obtained from the measured phase, it is allowed to obtain a reconstructed 3D shape of the measurement object.

At this time, in order to measure the shape of the 3D surface accurately with maximally decreasing errors promising to occur during the measurement due to external vibrations and environmental changes, it should be the first to potentiate the phase measurement at a high speed. If any external environmental errors occurred during the measurement affect the measurement object, this then causes a serious error in the measurement result.

Commonly, the majority of commercial displays including LCD have non-linear sensitivity feature in order to increase the human's visual recognition, particularly with a relatively great difference in dark colors rther than in bright colors. However, the sensitivity feature of digital devices, such as a camera, according to brightness is different from humans' eyes.

Measured is the intensity of a sinusoidal pattern formed on a display for the measurement in phase-shifting deflectometry through a camera, this then obtaining not actual sinusoidal pattern but distorted one. The non-linear component induced from the display and the camera promises to cause serious measurement errors in the measurement result.

SUMMARY

Technical Problem

Therefore, the present disclosure is provided to solve conventional problems as described in the above. In an embodiment in accordance with the present disclosure, scanned are a composite pattern of a plurality of patterns having different frequencies to a measurement object, so as to obtain images of the composite patterns. Wrapped phases by each frequency is obtained by taking Fourier transform on this composite pattern and unwrapped phases are obtained from the plurality of the wrapped phases. Thus, an object of the present disclosure is to provide an apparatus and a method for the profile measurement based on high-speed deflectometry using composite patterns, allowing rapidly and accurately measuring and analyzing the shape of a measurement object having a freeform surface.

Further, in another embodiment in accordance with the present disclosure, scanned are a plurality of composite patterns having different frequencies for a composite pattern generated by synthesizing two patterns having different frequencies, to the measurement object, so as to obtain a plurality of composite pattern images. Wrapped phases by each frequency are obtained by taking Fourier transform on these composite patterns and unwrapped phases are obtained from the plurality of the wrapped phases. Thus, another object of the present disclosure is to provide an apparatus and a method for the profile measurement based on high-speed deflectometry using composite patterns, allowing rapidly and accurately measuring and analyzing the shape of the measurement object having a freeform surface.

Meanwhile, technical objects to be achieved in the present disclosure are not limited to the aforementioned technical objects, and other technical objects, which are not mentioned above, will be apparently understood to a person having ordinary skill in the art from the following description.

Technical Solution

According to a first aspect of the present disclosure, a system for profile measurement based on high-speed deflectometry using composite patterns may include: a composite pattern generation part for projecting a composite pattern generated by synthesizing patterns having different frequencies to a measurement object; a detector for acquiring images of a deformed composite pattern reflected from the measurement object; and a phase acquisition part for acquiring wrapped phases by each frequency from the composite patterns and unwrapped phases from the respective wrapped phases.

According to another aspect of the present disclosure, the composite pattern may be generated by synthesizing a pattern in a first direction, i.e., a pattern in a vertical direction, a pattern in a second direction, i.e., a pattern in a horizontal direction, a pattern in a third direction rotated 45 degrees in a clockwise direction, and a pattern in a fourth direction rotated 45 degrees in an counterclockwise direction.

According to another aspect of the present disclosure, the phase acquisition part may include an independent pattern extraction part which decomposes the acquired composite pattern into the respective independent patterns in a first direction to a fourth direction through Fourier transform.

According to another aspect of the present disclosure, the phase acquisition part may include a regularization part which regularizes sine patterns for each of the independent patterns extracted by the independent pattern extraction part, and a wrapped phase extraction part which extracts wrapped phases from a plurality of spatial phase-shifting patterns moved into a pixel unit from the regularized sine patterns.

According to another aspect of the present disclosure, the regularization part may apply Lissajous figure and Ellipse fitting method to nonregularized sine pattern signals, so as to regularize the sine patterns.

According to another aspect of the present disclosure, the wrapped phase extraction part may obtain a plurality of spatial phase-shifting patterns moved in a pixel unit from the regularized sine patterns for each pattern in the first direction to the fourth direction, this then acquiring phase shifts for each of the spatial phase-shifting patterns. Thus, extracted are the wrapped phases for each pattern of the first direction to the fourth direction therefrom.

According to another aspect of the present disclosure, the system for profile measurement based on high-speed deflectometry using composite patterns may further include an unwrapped phase acquisition part for acquiring unwrapped phases for the patterns in the first direction and the second direction by obtaining one cycle of phases for the patterns in the first direction and the second direction.

According to another aspect of the present disclosure, the system for profile measurement based on high-speed deflectometry using composite patterns may further include an analyzing means for measuring and analyzing a 3D shape of the measurement object from the acquired phases.

According to a second aspect of the present disclosure, a method for profile measurement based on high-speed deflectometry using composite patterns may include the steps of: projecting, by a composite generation part, to a measurement object, a composite pattern generated by synthesizing a pattern in a first direction, i.e., a pattern in a vertical direction, a pattern in a second direction, i.e., a pattern in a horizontal direction, a pattern in a third direction rotated 45 degrees in a clockwise direction and a pattern in a fourth direction rotated 45 degrees in an anticlockwise direction; acquiring, by a detector, an image of deformed composite pattern reflected from the measurement object; acquiring, by a phase acquisition part, wrapped phases by each frequency from the composite pattern then acquiring unwrapped phases from each of the wrapped phases; and measuring and analyzing, by an analyzing means, a 3D shape of the measurement object from the acquired phases.

According to another aspect of the present disclosure, the step of acquiring the phase may include the steps of: decomposing, by an independent pattern extraction part, through Fourier transform, the acquired image of the composite pattern into each independent pattern of the patterns in the first direction to the fourth direction; regularizing, by a regularization part, sine patterns for each of the independent patterns extracted by the independent pattern extraction part; extracting wrapped phases from a plurality of spatial phase-shifting patterns moved in a pixel unit from the regularized sine patterns; and acquiring, by an unwrapped phase acquisition part, unwrapped phases for the patterns in the first direction and the second direction by obtaining one cycle of phases for the patterns in the first direction and the second direction.

According to another aspect of the present disclosure, the step of regularizing may apply Lissajous figure and Ellipse fitting method to nonregularized sine pattern signals, so as to regularize sine patterns, and the step of extracting the wrapped phase may obtain a plurality of the spatial phase-shifting patterns moved in a pixel unit from the regularized sine patterns for each pattern in the first direction to the fourth direction, may acquire phase shifts for each of the spatial phase-shifting patterns, and may extract, therefrom, the wrapped phases for each pattern in the first direction to the fourth direction.

According to a third aspect of the present disclosure, a system for profile measurement based on high-speed deflectometry using composite patterns may include: a composite pattern generation part for projecting, to a measurement object, a plurality of composite patterns having different frequencies for composite patterns generated by synthesizing a pattern in a first direction, i.e., a pattern in a vertical direction, a pattern in a second direction, i.e., a pattern in a horizontal direction; a detector for acquiring images of deformed composite patterns reflected from the measurement object; and a phase acquisition part for decomposing each of the plurality of composite patterns into the pattern in the first direction and the pattern in the direction, acquiring wrapped phases by each frequency for the patterns in the first direction and second directions, acquiring phases of the unwrapped phases in the first direction from the plurality of wrapped patterns in the first direction, and acquiring phases of the unwrapped phases in the second direction from the plurality of wrapped patterns in the second direction.

According to another aspect of the present disclosure, the phase acquisition part may include: an independent pattern extraction part for decomposing, through Fourier transform, each image of the plurality of the acquired composite patterns into each independent pattern of the plurality of the patterns in the first and second directions; a regularization part for regularizing sine patterns for each of the plurality of patterns in the first direction and the plurality of the patterns in the second direction extracted from the independent extraction part; and an unwrapped phase extraction part for extracting a plurality of unwrapped phases for the pattern in the first direction and a plurality of unwrapped phases for the patterns in the second direction, from a plurality of spatial-phase shifting-patterns moved in a pixel unit from the regularized sine.

According to another aspect of the present disclosure, the phase acquisition part may acquire unwrapped phases for the patterns in the first direction on the basis of a phase difference of the plurality of wrapped phases for the patterns in the first direction, and acquire unwrapped phases for the patterns in the second direction on the basis of a phase difference of the plurality of the wrapped phases for the pattern in the second direction.

According to a fourth aspect of the present disclosure, a method for shape measurement based on high-speed deflectometry using composite patterns may include the steps of: projecting, by a composite pattern generation part, to a measurement object, a plurality of composite patterns having different frequencies for composite patterns generated by synthesizing a pattern in a vertical direction, i.e., a pattern in a first direction and a pattern in a horizontal direction, i.e., a pattern in a second direction; acquiring, by a detector, images of a plurality of deformed composite patterns reflected from the measurement object; decomposing, by an independent pattern extraction part, through Fourier transform method, each of the acquired images of the plurality of composite patterns into each independent pattern of the plurality of patterns in the first and second directions; regularizing, by a regularization part, sine patterns for the plurality of the patterns in the first and second directions extracted by the independent pattern extraction part; extracting, by a wrapped phase extraction part, wrapped phases for each of the plurality of patterns in the first direction from a plurality of spatial phase-shifting patterns moved in a pixel unit from the regularized sine patterns and wrapped phases for each of the plurality of patterns in the second direction; acquiring, by an unwrapped phase acquisition part, unwrapped phases for the patterns in the first direction on the basis of a phase difference of the plurality of wrapped phases for the patterns in the first direction, and acquiring unwrapped phases for the patterns in the second direction on the basis of a phase difference of the plurality of the wrapped phases for the patterns in the second direction; and measuring and analyzing, by an analyzing means, a 3D shape of the measurement object from the acquired phases.

Advantageous Effects

According to a system and a method for 3D shape measurement of a freeform surface based on high-speed deflectometry using composite patterns in accordance with an embodiment of the present disclosure, a composite pattern generated by synthesizing a plurality of patterns having different frequencies is scanned to a measurement object, obtaining an image of the composite pattern, this then, through Fourier transform, to this composite pattern, obtaining wrapped phases by each frequency and obtaining unwrapped phases from the plurality of the wrapped phases. Thus, the profile measurement of an object having freeform surface is measured and analyzed rapidly and accurately.

Further, according to a system and a method for 3D shape measurement of a freeform surface based on high-speed deflectometry using composite patterns in accordance with another embodiment of the present disclosure, a plurality of composite patterns having different frequencies for composite patterns generated by synthesizing two patterns having different frequencies, are scanned to the measurement object, obtaining a plurality of composite pattern images, this then taking Fourier transform on these composite patterns, obtaining wrapped phases by each frequency and obtaining unwrapped phases from the plurality of the wrapped phases. Thus, the profile measurement of the object having freeform surface is measured and analyzed rapidly and accurately.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

REFERENCE NUMBERS

Figure 1:
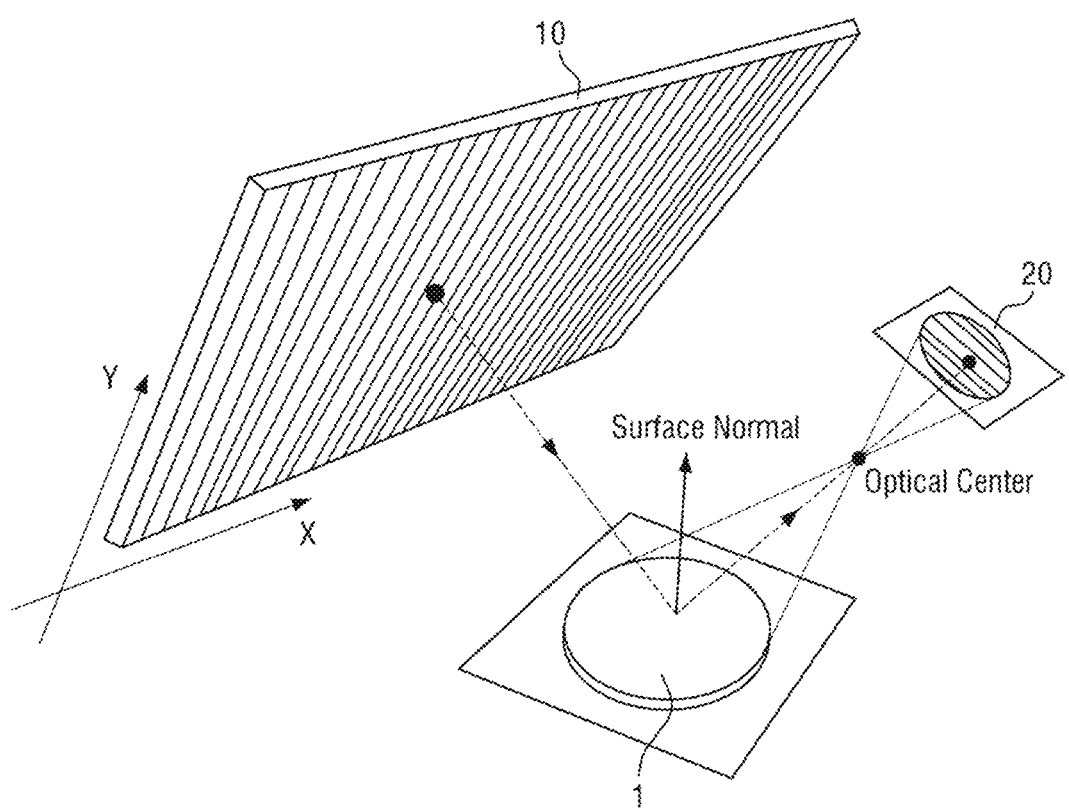
FIG. 1 is a schematic view of a system for 3D shape measurement based on deflectometry.

1: Measurement object
10: Composite pattern generation part
20: Detector
30: Phase acquisition part
31: Independent pattern extraction part
32: Regularization part
33: Wrapped phase extraction part
34: Unwrapped phase acquisition part
40: Analyzing means
100: System for profile measurement based on high-speed deflectometry using composite patterns

DETAILED DESCRIPTION

Best Mode

Figure 2:
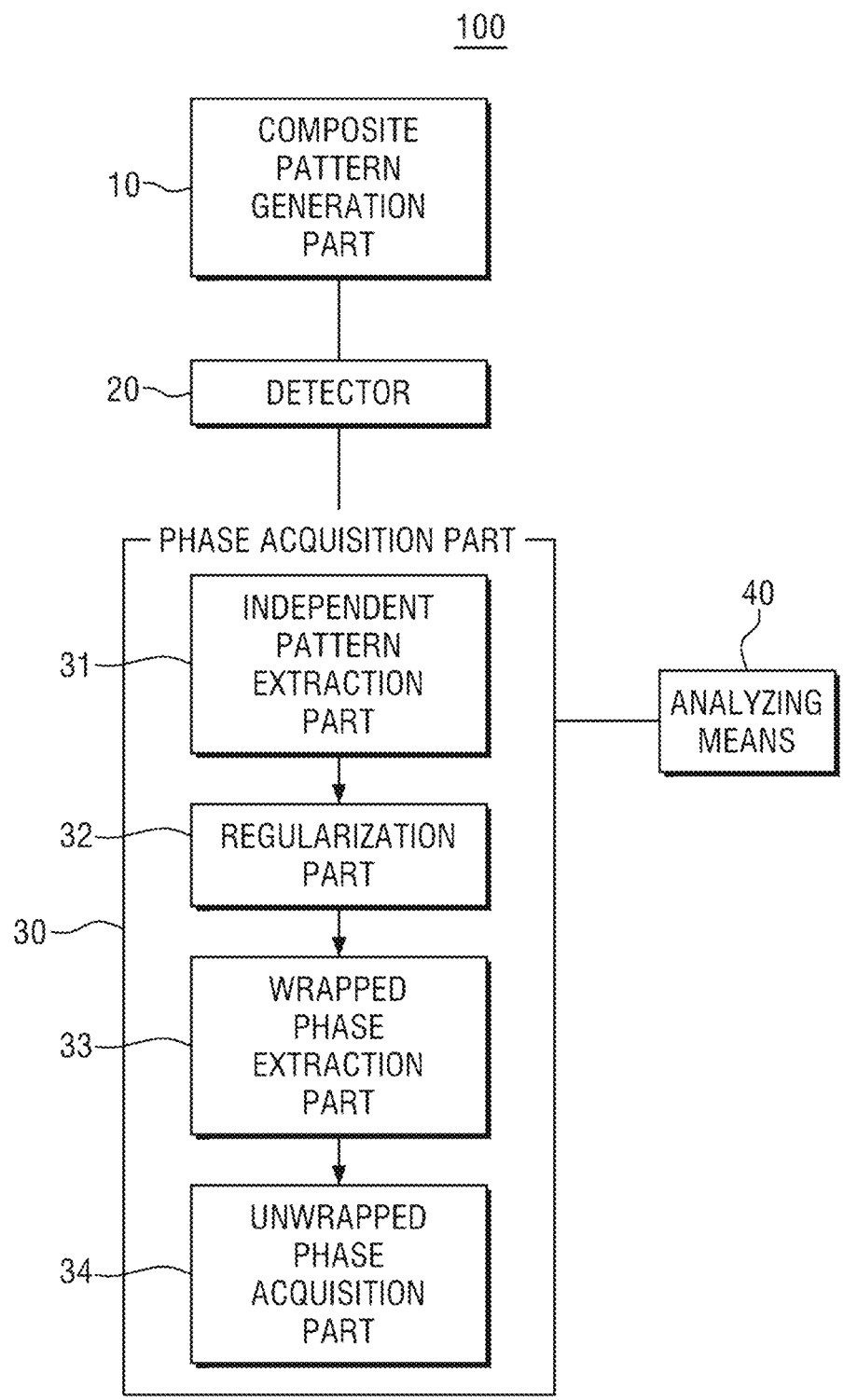
FIG. 2 is a view of the construction of a system for profile measurement based on high-speed deflectometry using composite patterns in accordance with the present disclosure.

Hereinafter, described are, in association with an embodiment of the present disclosure, the construction, functions of a system 100 for profile measurement based on high speed deflectometry using composite patterns and a method for profile measurement. FIG. 1 is a schematic view of a system 100 for 3D shape measurement based on deflectometry. And, FIG. 2 is a view of the construction of a system 100 for profile measurement based on high-speed deflectometry using composite patterns in accordance with the present disclosure.

In association with an embodiment of the present disclosure, provided are a system 100 and a method for 3D shape measurement of a measurement object at high speed in deflectometry.

The system 100 for profile measurement based on high speed deflectometry using composite patterns according to an embodiment of the present disclosure may be constructed to include a composite pattern generation part 10 which generates and projects a composite pattern to a measurement object, a detector 20 which acquires an image of a deformed composite pattern reflected from the measurement object 1, a phase acquisition part 30 which acquires each wrapped phase by each frequency from the composite pattern, and acquires each unwrapped phases from the wrapped phases, and an analyzing means 40 which measures and analyzes 3D shape of the measurement object from the acquired phases.

FIG. 1 is a schematic view of a system 100 for 3D shape measurement based on deflectometry. The composite pattern generation part 10 in association with the present disclosure projects, to the measurement object, the composite pattern generated by synthesizing patterns having different frequencies. And the detector 20 acquires an image of a deformed composite pattern reflected from the measurement object. Further, the phase acquisition part 30 acquires each wrapped phase by each frequency from the composite pattern, and acquires each unwrapped phases from the wrapped phases. Further, the analyzing means 40 analyzes the deformed phases measured in the detector 20, so as to obtain the 3D shape of the measurement object 1. Further, a control part is connected to both the composite pattern generation part 10 and the detector 20, thus controlling the both of them. As described in detail hereinafter, the phase acquisition part 30 in association with an embodiment of the present disclosure may be constructed to include an independent pattern extraction part 31, a regularization part 32, a wrapped phase measurement part and an unwrapped phase acquisition part 34.

DESCRIPTION OF EMBODIMENTS

Figure 3:
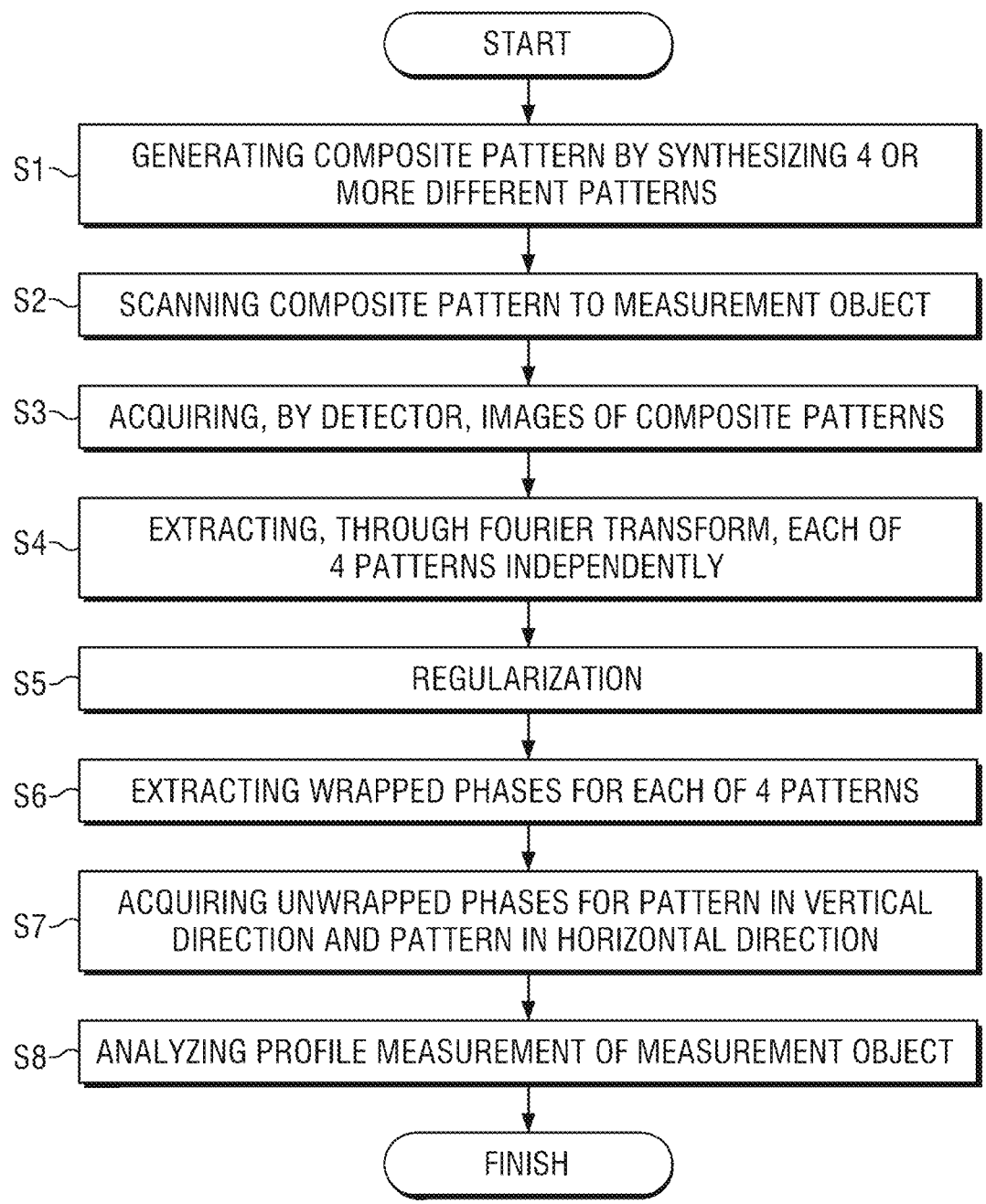
FIG. 3 is a flowchart of a method for profile measurement based on high-speed deflectometry using composite patterns in accordance with the first embodiment of the present disclosure.

Hereinafter, described in more detail is a method for profile measurement based on high-speed deflectometry using composite patterns in association with a first embodiment of the present disclosure. Firstly, FIG. 3 is a flow chart of the method for profile measurement based on high-speed deflectometry using composite patterns in accordance with the first embodiment of the present disclosure.

Figure 4:
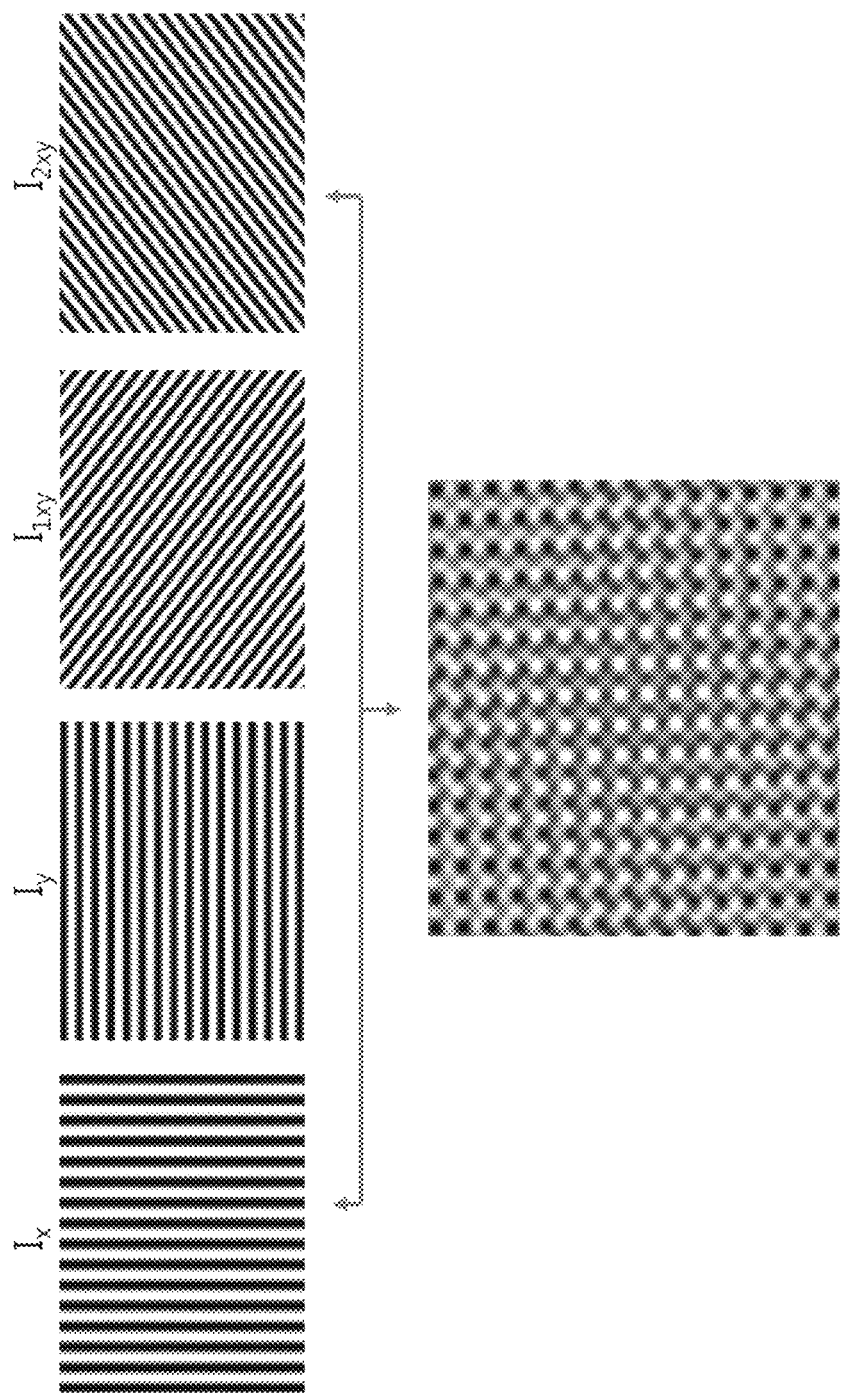
FIG. 4 is a view showing a method for generating a composite pattern by synthesizing 4 or more different patterns, by a composite pattern generation part in accordance with the first embodiment of the present disclosure.
Figure 5:
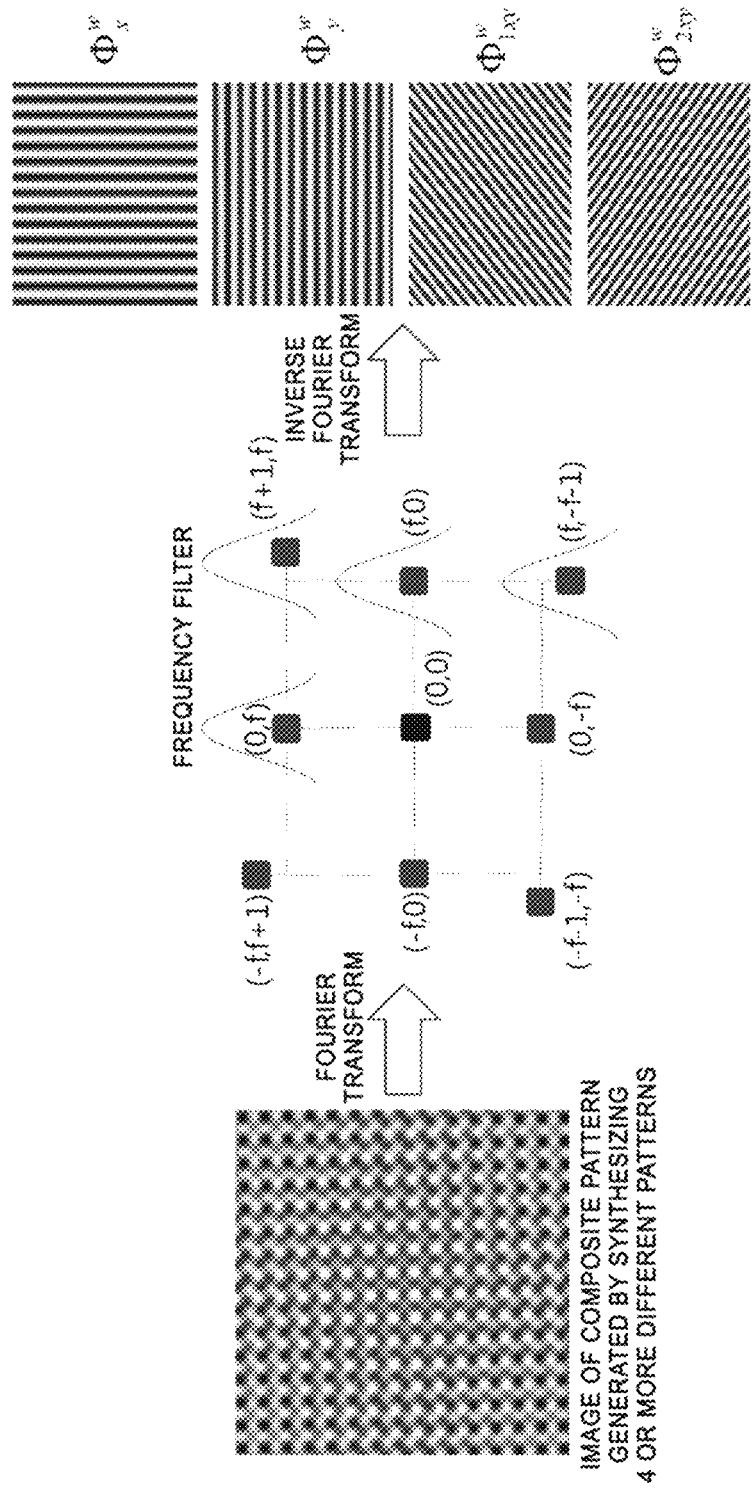
FIG. 5 is a view showing a method for extracting 4 independent phases from a composite pattern through Fourier transform by an independent pattern extraction part in accordance with the first embodiment of the present disclosure.

The first embodiment of the present disclosure is related to unwrapping algorithm using a composite pattern having 4 different frequencies in the deflectometry, as shown in FIGS. 4 and 5, so as to acquire, through Fourier transform, each wrapped phase by frequency and acquiring unwrapped phases from the 4 wrapped phases. The composite pattern generation part in association with the first embodiment of the present disclosure generates 4 different patterns. The generated patterns are a pattern in a first direction, i.e., a pattern in a vertical direction, a pattern in a second direction, i.e., a pattern in a horizontal direction, a pattern in a third direction rotated 45 degrees in a clockwise direction and a pattern in a fourth direction rotated 45 degrees in an anti-clockwise direction. The respective patterns are represented by Formulas 1 to 4 as below.

Pattern in the first direction $$I_x(x, y) = \frac{A}{2}(1 + \cos(2\pi fx))$$ [Formula 1]

Pattern in the second direction $$I_y(x, y) = \frac{A}{2}(1 + \cos(2\pi fy))$$ [Formula 2]

Pattern in the third direction $$I_{1xy}(x, y) = \frac{A}{2}(1 + \cos[2\pi(f+1)x + 2\pi fy])$$ [Formula 3]

Pattern in the fourth direction $$I_{2xy}(x, y) = \frac{A}{2}(1 + \cos[2\pi(-f)x + 2\pi(f+1)y])$$ [Formula 4]

And as synthesizing the patterns of Formulas 1 to 4, the composite pattern of the following Formula 5 or 6 (S1). FIG. 4 is a view showing a method for generating the composite pattern by synthesizing 4 or more different patterns, by the composite pattern generation part 10 in accordance with the first embodiment of the present disclosure.

$$I_{composite}(x, y) = \frac{I_x + I_y + I_{1xy} + I_{2xy}}{4}$$ [Formula 5]

or, $$I_{compisite} = \frac{A}{8}(4 + \cos(2\pi fx) + \cos(2\pi fy) +$$ [Formula 6]

$$\cos[2\pi(f+1)x + 2\pi fy] + \cos[2\pi(-f)x + 2\pi(f-1)y]),$$

wherein, f represents a frequency to be scanned to the pattern generation part.

And the composite pattern is scanned to the measurement object, this then acquiring an image of the composite pattern reflected through the detector (camera) 20 (S3).

Then, the independent pattern extraction part 31 decomposes, through Fourier transform, the acquired image of the composite pattern into each independent pattern of patterns in the first to fourth directions (S4).

Figure 6:
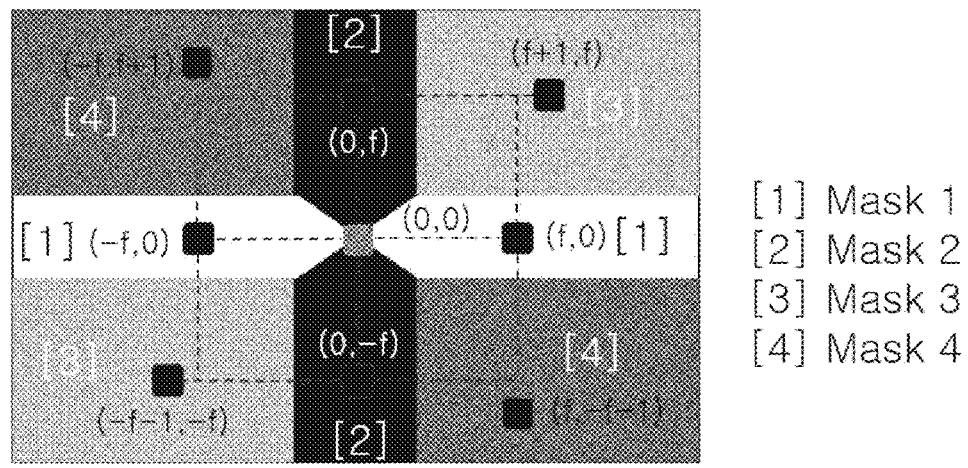
FIG. 6 is a view showing frequency component analysis of a composite pattern and positions of each filter in the Fourier area in association with the first embodiment of the present disclosure.
Figure 7:
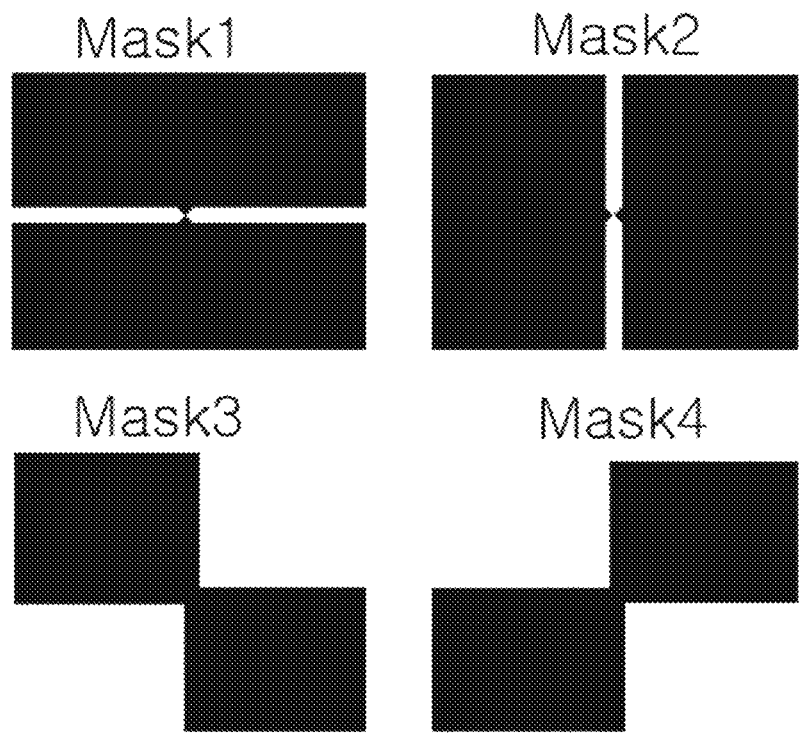
FIG. 7 shows each shape of filters in the Fourier area for decomposing a composite pattern into 4 patterns in association with the first embodiment of the present disclosure.

That is, the independent pattern extraction part 31 decomposes, through Fourier transform, the acquired composite pattern into 4 independent patterns. The technical feature of the present application is to use spatial-carrier frequency phase-shifting method (SCFPS) in order to measure, through Fourier transform, phases from the 4 independent patterns. FIG. 5 shows a method for extracting 4 independent patterns from a composite pattern through Fourier transform in association with the first embodiment of the present disclosure. And FIG. 6 is a view showing frequency component analysis of a composite pattern and positions of each filter in the Fourier area in association with the first embodiment of the present disclosure. Further, FIG. 7 shows each shape of filters in the Fourier area for decomposing a composite pattern into 4 patterns in association with the first embodiment of the present disclosure.

This method settles matters of errors at boundaries in Fourier transform method, concurrently with extracting accurate phases using phase-shifting method.

$$I'_{composite}(u,v) = A(0,0) + D_x \exp(u-f,v) + D^*_x \exp(u+f,v) +$$
$$D_y \exp(u,v-f) + D^*_y \exp(u,v+f) + D_{1xy} \exp(u-f,v-f) + D^*_{1xy} \exp(u+f+1,v+f) + D_{2xy} \exp(u-f,v+f+1) +$$
$$D^*_{2xy} \exp(u+f,v-f-1)$$ [Formula 7]

wherein capital letters represent the respective frequency components in the Fourier area, u and v represent coordinates therein, and f represents a carrier frequency value. At this time, the carrier frequency value, f should be provided with a value large enough to avoid overlapping the respective frequency components. Four filters provided in FIG. 7 are applied to frequency distribution components in the Fourier area of FIG. 6, thus obtaining frequency components of the following Formulas 8 to 11.

$$\Theta_x(u,v)=D_x \exp(u-f,v)+D^*_x \exp(u+f,v) \quad \text{[Formula 8]}$$

$$\Theta_y(u,v)=D_y \exp(u,v-f)+D^*_y \exp(u,v+f) \quad \text{[Formula 9]}$$

$$\Theta_{1xy}(u,v)=D_{1xy} \exp(u-f-1,v-f)+D^*_{1xy} \exp(u+f+1,v+f) \quad \text{[Formula 10]}$$

$$\Theta_{2xy}(u,v)=D_{2xy} \exp(u-f,v-f-1)+D^*_{2xy} \exp(u+f,v+f+1) \quad \text{[Formula 11]}$$

Further, as taking Fourier transform on the respective frequency components acquired in the above, obtained are signals of the following Formulas 12 to 15.

$$I_x(x,y)=|FFT^{-1}(\Theta_x(u,v))| \quad \text{[Formula 12]}$$

$$I_y(x,y)=|FFT^{-1}(\Theta_y(u,v))| \quad \text{[Formula 13]}$$

$$I_{1xy}(x,y)=|FFT^{-1}(\Theta_{1xy}(u,v))| \quad \text{[Formula 14]}$$

$$I_{2xy}(x,y)=|FFT^{-1}(\Theta_{2xy}(u,v))| \quad \text{[Formula 15]}$$

wherein | | represents the absolute value.

And measured are the wrapped phases through spatial-carrier frequency phase-shifting method (SCFPS). That is, extracted are the wrapped phases of sine patterns decomposed by each frequency through SCFPS method.

The phase acquisition part 30 in accordance with the first embodiment of the present disclosure is constructed to include a regularization part 32 which regularizes the sine patterns for the respective independent patterns extracted by the independent pattern extraction part 31, and a wrapped phase extraction part 33 which extracts the wrapped patterns from the plurality of spatial phase-shifting patterns moved in a pixel unit from the regularized sine patterns.

Figure 8:
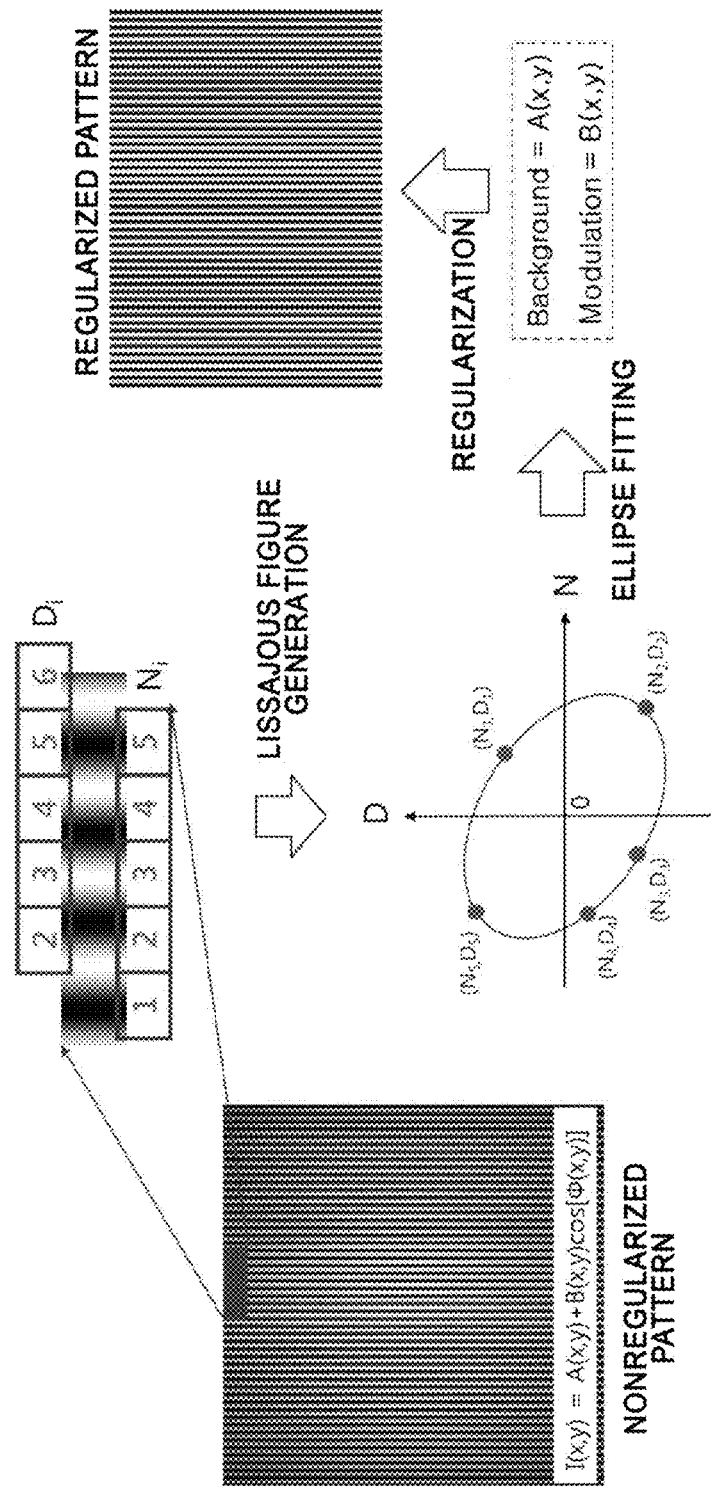
FIG. 8 is a view showing a method for generating Lissajous figure and regularizing patterns for applying spatial-carrier frequency phase-shifting method (SCFPS) in association with the first embodiment of the present disclosure.

The regularization part 32 applies Lissajous figure and, Ellipse fitting method to nonregularized sine pattern signals, so as to regularize the sine patterns (S5). That is, used are Lissajous figure and Ellipse fitting method in order to minimize errors promising to occur as the sine patterns are deformed according to external environment and the condition of a measurement specimen when extracting the phases. The sine patterns are regularized through these methods, so as to increase the accuracy of phase extractions. Commonly, the nonregularized sine pattern signals are represented by the following formula 16.

$$I_x(x,y)=A(x,y)+B(x,y)\cos(\Phi(x,y)) \quad \text{[Formula 16]}$$

wherein, A(x,y) and B(x,y) represent values for the dimension of the backlight of the sine patterns and for the amplitude thereof. FIG. 8 is a view showing a method for generating Lissajous figure and regularizing patterns, so as to apply spatial-carrier frequency phase-shifting method (SCFPS) in association with the first embodiment of the present disclosure.

As shown in FIG. 8, obtained are 5 values [1, 2, 3, 4, 5] of pixel information from the signal of the nonregularized sine patterns sequentially, then saved in $N_i$ (i=1, 2, 3, 4, 5). As moving one pixel, obtained are $N_i$ and 5 values [2, 3, 4, 5, 6] of pixel information sequentially, then saved in $D_i$ (i=1, 2, 3, 4, 5). Following this, Lissajous figure is generated in which x- and y-axes are as $N_i$ and $D_i$, respectively. In order to generate the Lissajous figure, required are at least 5 or more measurement values, wherein the accuracy in the measurement becomes increased as much as the number of measurement values, while there is a drawback to take longer time for the calculation. The generated Lissajous figure is represented in an oval shape and as a conic equation of the following formula 17.

$$C_1 \cdot I_1^2+2C_2 \cdot I_1 I_2+C_3 \cdot I_2^2+2C_4 \cdot I_1+2C_5 \cdot I_2+C_6=0 \quad \text{[Formula 17]}$$

wherein, $I_1=N_i$, $I_2=D_i$(C1, C2, C3, C4, C5, C6) being conic constants. (At this time, for the convenience of the equation, C6 is normally provided as −1).

The dimension of the backlight of the sine patterns and the amplitude thereof are calculated by least square fitting method as below.

$$A(x,y) = \frac{C_2 C_5 - C_3 C_4}{\alpha}, B(x,y) = \frac{\sqrt{-C_3 \Delta}}{\alpha} \quad \text{[Formula 18]}$$

wherein, $\alpha$ and $\Delta$ are as the following Formula 19.

$$\alpha = \begin{vmatrix} C_1 & C_2 \\ C_2 & C_3 \end{vmatrix}, \Delta = \begin{vmatrix} C_1 & C_2 & C_4 \\ C_2 & C_3 & C_5 \\ C_4 & C_5 & C_6 \end{vmatrix} \quad \text{[Formula 19]}$$

And the values for the backlight and the amplitude are acquired, this then potentiating regularization of the sine patterns as below.

$$\tilde{I}_x(x,y) = \frac{I_x(x,y) - A(x,y)}{B(x,y)} \quad \text{[Formula 20]}$$

And the wrapped phase extraction part 33 extracts wrapped phases from a plurality of spatial-phase shifting-patterns moved in a pixel unit from the regularized sine patterns (S6). That is, the wrapped phase extraction part 33 obtains the plurality of spatial-phase shifting-patterns moved in a pixel unit for each of the patterns in the first to fourth directions from the regularized sine patterns, obtains phase shifts for each of the spatial-phase shifting-patterns and extracts, therefrom, the wrapped phases for each of the patterns in the first to fourth directions.

Particularly, obtained are 4 spatial-phase shifting-patterns moved in a pixel unit as below from the regularized sine patterns. The pattern in the vertical direction, i.e., the pattern in the first direction is as the following Formulas 21 to 24.

$$\tilde{I}_{1x}(x,y)=\tilde{I}_x(x,y)=\tilde{A}_{1x}(x,y)+\tilde{B}_{1x}(x,y)\cos\{\Phi_x(x,y)+\delta_{1x}(x,y)\} \quad \text{[Formula 21]}$$

$$\tilde{I}_{2x}(x,y)=\tilde{I}_x(x+1,y)=\tilde{A}_{2x}(x,y)+\tilde{B}_{2x}(x,y)\cos\{\Phi_x(x,y)+\delta_{2x}(x,y)\} \quad \text{[Formula 22]}$$

$$\tilde{I}_{3x}(x,y)=\tilde{I}_x(x+2,y)=\tilde{A}_{3x}(x,y)+\tilde{B}_{3x}(x,y)\cos\{\Phi_x(x,y)+\delta_{3x}(x,y)\} \quad \text{[Formula 23]}$$

$$\tilde{I}_{4x}(x,y)=\tilde{I}_x(x+3,y)=\tilde{A}_{3x}(x,y)+\tilde{B}_{3x}(x,y)\cos\{\Phi_x(x,y)+\delta_{3x}(x,y)\} \quad \text{[Formula 24]}$$

And the pattern in the horizontal direction, i.e., the pattern in the second direction is as the following Formulas 25 to 29.

$$\tilde{I}_{1y}(x,y)=\tilde{I}_y(x,y)=\tilde{A}_{1y}(x,y)+\tilde{B}_{1y}(x,y)\cos\{\Phi_y(x,y)+\delta_{1y}(x,y)\} \quad \text{[Formula 25]}$$

$$\tilde{I}_{2y}(x,y)=\tilde{I}_y(x,y+1)=\tilde{A}_{2y}(x,y)+\tilde{B}_{2y}(x,y)\cos\{\Phi_y(x,y)+\delta_{2y}(x,y)\} \quad \text{[Formula 26]}$$

$$\tilde{I}_{3y}(x,y)=\tilde{I}_y=(x,y+2)\tilde{A}_{3y}(x,y)+\tilde{B}_{3y}(x,y)\cos\{\Phi_y(x,y)+\delta_{3y}(x,y)\}$$ [Formula 27]

$$\tilde{I}_{4y}(x,y)=\tilde{I}_y(x,y+3)=\tilde{A}_{4y}(x,y)+\tilde{B}_{4y}(x,y)\cos\{\Phi_y(x,y)+\delta_{4y}(x,y)\}$$ [Formula 28]

And the pattern in the third direction rotated 45 degrees in a clockwise direction from the pattern in the horizontal direction is as the following Formulas 29 to 32.

$$\tilde{I}_{11xy}(x,y)=\tilde{I}_{1xy}(x,y)=\tilde{A}_{11xy}(x,y)+\tilde{B}_{11xy}(x,y)\cos\{\Phi_{1xy}(x,y)+\delta_{11xy}(x,y)\}$$ [Formula 29]

$$\tilde{I}_{21xy}(x,y)=\tilde{I}_{1xy}(x+1,y)=\tilde{A}_{21xy}(x,y)+\tilde{B}_{21xy}(x,y)\cos\{\Phi_{1xy}(x,y)+\delta_{21xy}(x,y)\}$$ [Formula 30]

$$\tilde{I}_{31xy}(x,y)=\tilde{I}_{3xy}(x,y+1)=\tilde{A}_{31xy}(x,y)+\tilde{B}_{31xy}(x,y)\cos\{\Phi_{1xy}(x,y)+\delta_{31xy}(x,y)\}$$ [Formula 31]

$$\tilde{I}_{41xy}(x,y)=\tilde{I}_{1xy}(x+1,y+1)=\tilde{A}_{41xy}(x,y)+\tilde{B}_{41xy}(x,y)\cos\{\Phi_{1xy}(x,y)+\delta_{41xy}(x,y)\}$$ [Formula 32]

And the pattern in the fourth direction rotated 45 degrees in an counterclockwise direction from the pattern in the horizontal direction is as the following Formulas 33 to 36.

$$\tilde{I}_{12xy}(x,y)=\tilde{I}_{2xy}(x,y)=\tilde{A}_{12xy}(x,y)+\tilde{B}_{12xy}(x,y)\cos\{\Phi_{2xy}(x,y)+\delta_{12xy}(x,y)\}$$ [Formula 33]

$$\tilde{I}_{22xy}(x,y)=\tilde{I}_{2xy}(x+1,y)=\tilde{A}_{22xy}(x,y)+\tilde{B}_{22xy}(x,y)\cos\{\Phi_{2xy}(x,y)+\delta_{22xy}(x,y)\}$$ [Formula 34]

$$\tilde{I}_{32xy}(x,y)=\tilde{I}_{2xy}(x,y+1)=\tilde{A}_{32xy}(x,y)+\tilde{B}_{32xy}(x,y)\cos\{\Phi_{2xy}(x,y)+\delta_{32xy}(x,y)\}$$ [Formula 35]

$$\tilde{I}_{42xy}(x,y)=\tilde{I}_{2xy}(x+1,y+1)=\tilde{A}_{42xy}(x,y)+\tilde{B}_{42xy}(x,y)\cos\{\Phi_{2xy}(x,y)+\delta_{42xy}(x,y)\}$$ [Formula 36]

And a method for extracting the wrapped phases from the aforementioned spatial-phase shifting-patterns is as below. The patterns in the vertical direction, for example, are as below. Firstly, the regularized pattern in the vertical direction, i.e., the pattern in the first direction is represented by the following Formula 37.

$$\tilde{I}_x(x,y)=\tilde{A}_x(x,y)+\tilde{B}_x(x,y)\cos\{\Phi_x(x,y)\}$$ [Formula 37]

wherein, in the right-hand side, a first value represents regularized backlight and a second value represents regularized amplitude. Thus, in theory, the first value is 0 and the second value is 1.

In fact, the first and second values are changed in the sine patterns due to external noises, however being supposed as the following Formula 38 in 4 adjacent pixels.

$$\begin{cases} \tilde{A}_x(x,y) \approx \tilde{A}_{1x}(x,y) \approx \tilde{A}_{2x}(x,y) \approx \tilde{A}_{3x}(x,y) \approx \tilde{A}_{4x}(x,y) \\ \tilde{B}_x(x,y) \approx \tilde{B}_{1x}(x,y) \approx \tilde{B}_{2x}(x,y) \approx \tilde{B}_{3x}(x,y) \approx \tilde{B}_{4x}(x,y) \end{cases}$$ [Formula 38]

A method for obtaining the phases from the patterns in the vertical direction represented by Formulas 21 and 24 is as below. The phase shifts may be the same or different in each pixel, however, Fourier transform method or least square iterative method is performed in order to compensate the phase shifts changed due to external vibrations and noises. In accordance with the first embodiment of the present disclosure, described is the method for obtaining the phase shifts through Fourier transform and obtaining the phases therefrom. The pattern in the vertical direction represented by Formula 21 is Fourier transformed, this then being represented as the following Formula 39.

$$\tilde{I}_{1x}(u,v)=a_{1x}(u,v)+d_{1x}\exp(u-f,v)+d^*_{1x}\exp(u+f,f)$$ [Formula 39]

And only a specific frequency, an f component is obtained through a filter and then is inverse Fourier transformed, this then being as the following Formula 40.

$$D_{1x}(x,y)=FFT^{-1}[d_{1x}(u,v)]$$ [Formula 40]

Then, the phase of $\tilde{I}_{1x}(x,y)$ is provided as the following Formula 41.

$$\varphi_{1x}(x,y) = \text{wrap}\,[\Phi_x(x,y)+\delta_{1x}(x,y)] = \tan^{-1}\left(\frac{imag[D_{1x}(x,y)]}{\text{real }[D_{1x}(x,y)]}\right)$$ [Formula 41]

Similarly, the phase of $\tilde{I}_{2x}(x,y)$, $\tilde{I}_{3x}(x,y)$, $\tilde{I}_{4x}(x,y)$ is produced as the following Formulas 42 to 44.

$$\varphi_{2x}(x,y)=\text{wrap}[\Phi_x(x,y)+\delta_{2x}(x,y)]$$ [Formula 42]

$$\varphi_{3x}(x,y)=\text{wrap}[\Phi_x(x,y)+\delta_{3x}(x,y)]$$ [Formula 43]

$$\varphi_{4x}(x,y)=\text{wrap}[\Phi_x(x,y)+\delta_{4x}(x,y)]$$ [Formula 44]

And the respective phase shifts are provided from the acquired phases as the following Formulas 45 to 48.

$$\delta_{1x}(x,y)=0$$ [Formula 45]

$$\delta_{2x}(x,y)=\text{unwrap}[\varphi_{2x}(x,y)]-\text{unwrap}[\varphi_{1x}(x,y)]$$ [Formula 46]

$$\delta_{3x}(x,y)=\text{unwrap}[\varphi_{3x}(x,y)]-\text{unwrap}[\varphi_{1x}(x,y)]$$ [Formula 47]

$$\delta_{4x}(x,y)=\text{unwrap}[\varphi_{4x}(x,y)]-\text{unwrap}[\varphi_{1x}(x,y)]$$ [Formula 48]

And each of the acquired phase shifts are input into the repeated least square algorithm, so as to provide phase values for the respective patterns as below. The patterns in the vertical direction represented by from Formula 21 to Formula 24 are represented by the following Formula 49.

$$\tilde{I}_{nx}(x,y)=\tilde{A}_x(x,y)+E(x,y)\cos(\delta_{nx}(x,y))+F(x,y)\sin(\delta_{nx}(x,y))$$ [Formula 49]

wherein, $$E(x,y)=\tilde{B}_x(x,y)\cos(\Phi_x(x,y))$$

$$F(x,y)=-\tilde{B}_x(x,y)\sin(\Phi_x(x,y))$$

According to the least square algorithm, it is only to obtain a phase value at the time when an error value represented by the following Formula 50 becomes minimum.

$$S(x,y) = \sum_{n=1}^{N}(\tilde{I}^e_{nx}(x,y) - \tilde{I}_{nx}(x,y))^2$$ [Formula 50]

wherein $\tilde{I}_{nx}^e(x,y)$ is a regularized pattern value obtained through tests, and N represents the number of the whole patterns acquired. The phase value satisfies the following condition when Formula 50 becomes minimum.

$$\frac{\partial S(x,y)}{\partial A_x(x,y)} = 0, \frac{\partial S(x,y)}{\partial E(x,y)} = 0, \frac{\partial S(x,y)}{\partial F(x,y)} = 0$$ [Formula 51]

And the above Formula 51 is represented as below.

$$PX = Q \quad \text{[Formula 52]}$$

wherein, $$P = \begin{bmatrix} N & \sum_{n=1}^{N}\cos\delta_{nx} & \sum_{n=1}^{N}\sin\delta_{nx} \\ \sum_{n=1}^{N}\cos\delta_{nx} & \sum_{n=1}^{N}\cos^2\delta_{nx} & \sum_{n=1}^{N}\cos\delta_{nx}\sin\delta_{nx} \\ \sum_{n=1}^{N}\sin\delta_{nx} & \sum_{n=1}^{N}\sin\delta_{nx}\cos\delta_{nx}x & \sum_{n=1}^{N}\sin^2\delta_{nx} \end{bmatrix} \quad \text{[Formula 53]}$$

$$Q = \left[ \sum_{n=1}^{N}\tilde{I}_{nx}(x,y) \quad \sum_{n=1}^{N}\tilde{I}_{nx}(x,y)\cos\delta_n \quad \sum_{n=1}^{N}\tilde{I}_{nx}(x,y)\sin\delta_n \right]^T \quad \text{[Formula 54]}$$

$$X = \left[ \tilde{A}_x(x,y) \quad E(x,y) \quad F(x,y) \right]^T \quad \text{[Formula 55]}$$

wherein, $\delta_{nx}(x,y)$ is simply represented as $\delta_{nx}$.

The phase is provided from the pattern $I_x(x,y)$ by using $E(x,y)$ and $F(x,y)$ acquired in the above, being as the following Formula 56.

$$\Phi_{wx}(x,y) = \tan^{-1}\left\{\frac{-E(x,y)}{F(x,y)}\right\} \quad \text{[Formula 56]}$$

Similarly, the phase values $\Phi_{wy}(x,y)$, $\Phi_{w1xy}(x,y)$, $\Phi_{w2xy}(x,y)$ by a pattern are provided from the respective patterns, $I_y(x,y)$, $I_{1xy}(x,y)$, $I_{2xy}(x,y)$.

And the phase acquisition part 30 in association with the first embodiment of the present disclosure includes the unwrapped phase acquisition part 34, and the unwrapped phase acquisition part 34 obtains one cycle of phases for the pattern in the first direction and the pattern in the second direction, so as to acquire the unwrapped phases for the pattern in the first direction and the pattern in the second direction (S7).

That is, the unwrapped phases can be calculated, through the method as below, from the 4 unwrapped phases acquired. Like the undermost Formulas 57 and 58, obtained are one cycle of phases for the pattern in the vertical direction, i.e., the pattern in the first direction and the pattern in the horizontal direction, i.e., the pattern in the second direction.

$$\theta_x(x,y) = \text{wrapToPi}[\Phi_{w1xy}(x,y) - \Phi_{wx}(x,y) - \Phi_{wy}(x,y)] \quad \text{[Formula 57]}$$

$$\theta_y(x,y) = \text{wrapToPi}[\Phi_{w2xy}(x,y) + \Phi_{wx}(x,y) - \Phi_{wy}(x,y)] \quad \text{[Formula 58]}$$

wherein, wrapToPi is a conversion operator which reconstructs the phase value in the range of $[-\pi, \pi]$, being represented as below.

$$\text{wrapToPi}[\alpha] = \text{mod}(\alpha + \pi, 2\pi) - \pi \quad \text{[Formula 59]}$$

wherein, "mod" means a remainder following the division by $2\pi$. Then, the unwrapped phases for the patterns in the vertical and horizontal directions are provided as the following formulas 60 and 61.

$$\Phi_x(x,y) = \text{round}\left[\frac{\theta_x(x,y)f - \Phi_{wx}(x,y)}{2\pi}\right]2\pi + \Phi_{wx}(x,y) \quad \text{[Formula 60]}$$

$$\Phi_y(x,y) = \text{round}\left[\frac{\theta_y(x,y)f - \Phi_{wy}(x,y)}{2\pi}\right]2\pi + \Phi_{wy}(x,y) \quad \text{[Formula 61]}$$

And the analyzing means 40 measures and analyzes the 3D shape of the measurement object from the acquired phases (S8).

Figure 9:
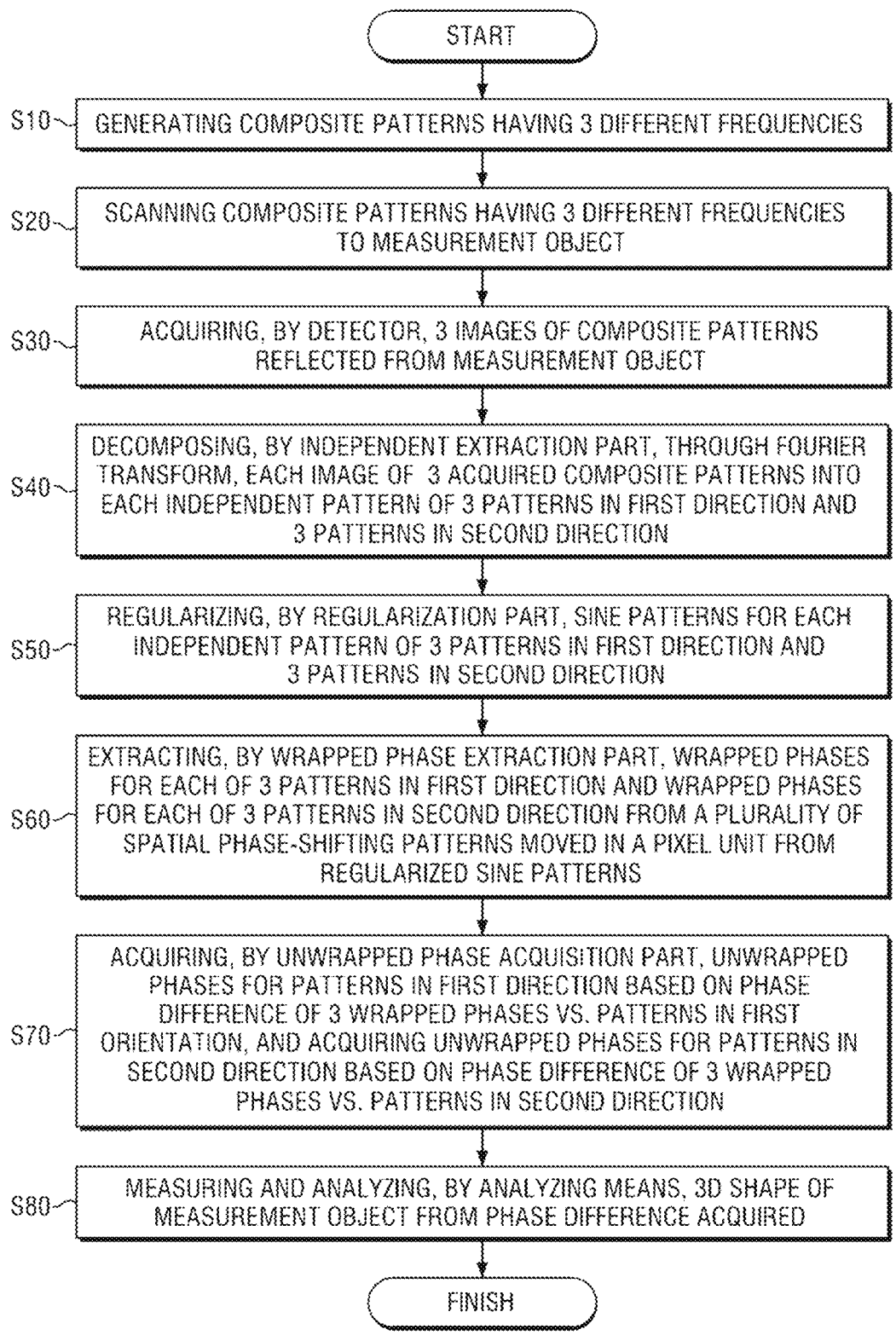
FIG. 9 is a flowchart of a method for shape measurement based on high-speed deflectometry using composite patterns in association with the second embodiment of the present disclosure.

Hereinafter, described is a method for profile measurement based on high-speed deflectometry using composite patterns in association with a second embodiment of the present disclosure. Firstly, FIG. 9 is a flow chart of a method for profile measurement based on high-speed deflectometry using composite patterns in association with the second embodiment of the present disclosure. And FIG. 10 is a flow chart for acquiring unwrapped phases using spatial-carrier frequency phase-shifting method (SCFPS) in 3 composite patterns having different frequencies in association with the second embodiment of the present disclosure.

Figure 10:
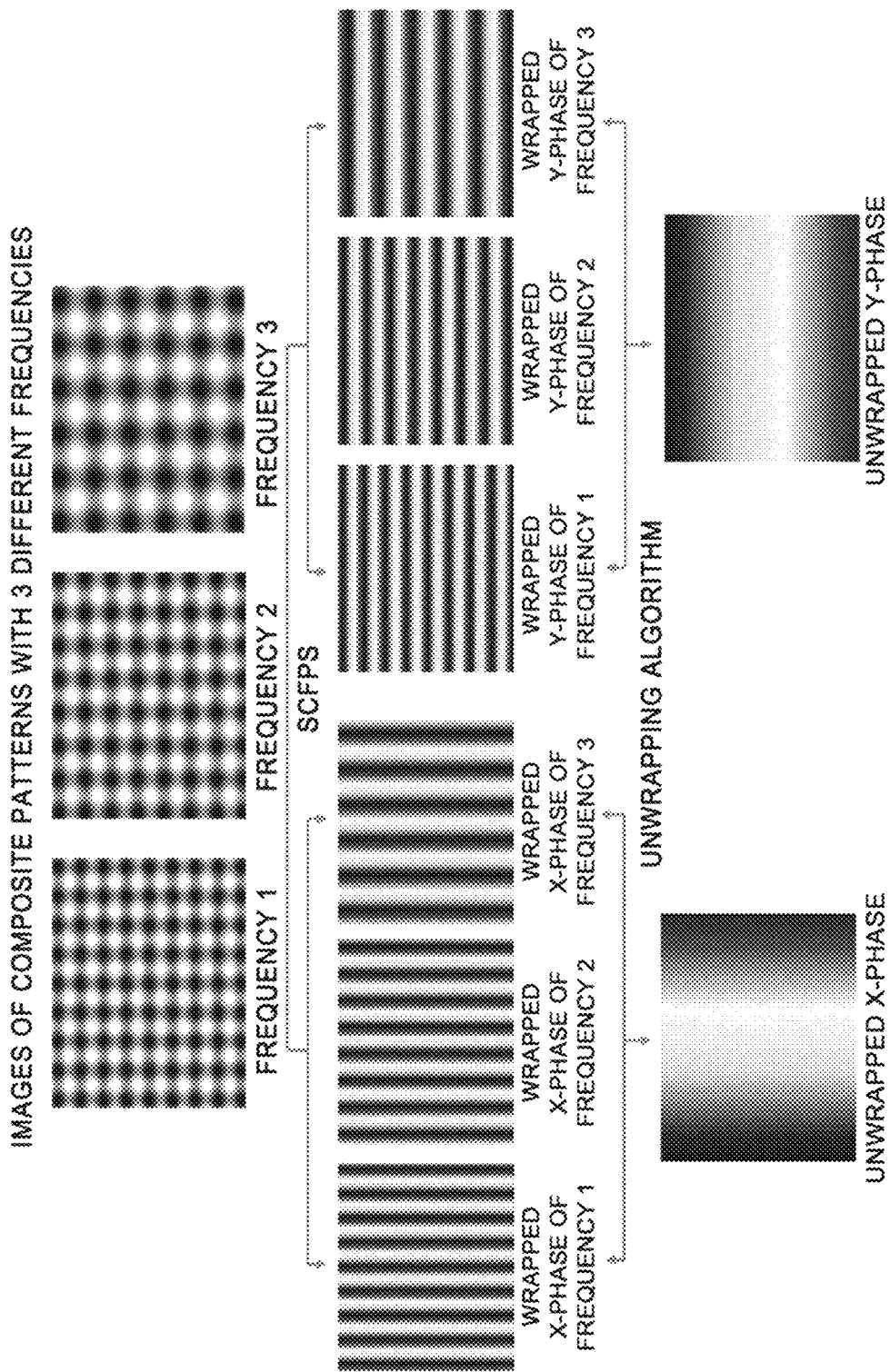
FIG. 10 is a flowchart for acquiring unwrapped phases using spatial-carrier frequency phase-shifting method (SCFPS) in 3 composite patterns having different frequencies in association with the second embodiment of the present disclosure.
Figure 11:
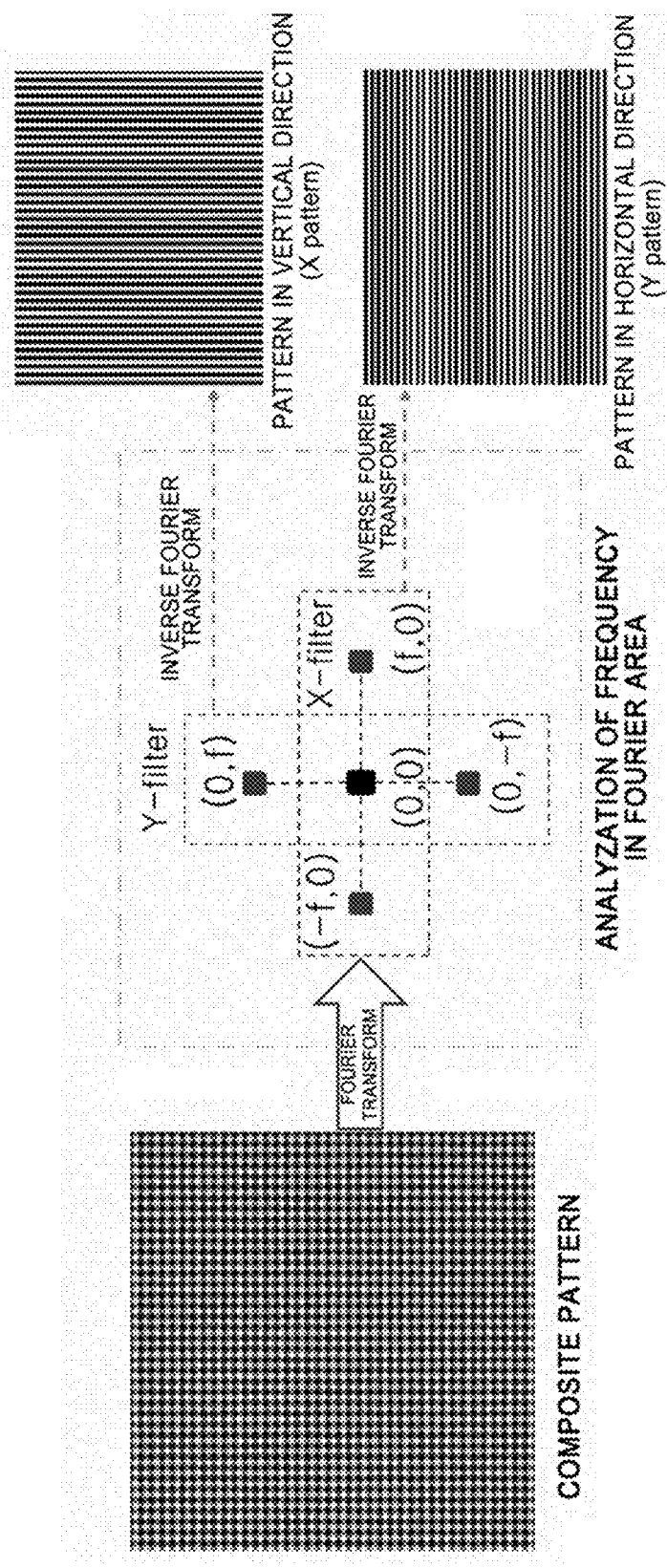
FIG. 11 shows a method for extracting independent patterns in the first and second directions from a composite pattern through Fourier transform, by an independent pattern extraction part in association with the second embodiment of the present disclosure.

As shown in FIGS. 10 and 11, similarly to the first embodiment, in the second embodiment of the present disclosure, generated are a plurality of composite patterns having different frequencies for composite patterns generated by synthesizing a pattern in a vertical direction, i.e., a pattern in a first direction and a pattern in a horizontal direction, i.e., a pattern in a second direction (S10), this then being scanned to a measurement object (S20). A detector 20 acquires these reflected composite patterns (S30), a phase acquisition 30 part extracts each of the patterns in the first and second directions for the plurality of composite patterns, independently (S40), followed by regularization (S50). Following extracting a plurality of wrapped phases for each of the patterns in the first and second directions (S60), acquired are unwrapped phases from the wrapped phases of the plurality of the patterns in the first direction and unwrapped phases from the wrapped phases of the plurality of the patterns in the second direction (S70). And the shape of the measurement object is analyzed based on the acquired unwrapped phases (S80).

Particularly, first, a composite pattern generation part generates composite patterns using different frequencies. The composite patterns are represented by the sum of the pattern in the vertical direction, i.e., the pattern in the first direction and the pattern in the horizontal direction i.e., the pattern in the second direction, and forms a number of the composite patterns having different frequencies. If the number of the composite patterns is small, the time for measurement thereof would be shortened while decreasing a measurement accuracy. On the other hand, if the number of the composite patterns is large, the time for measurement thereof would be longer while increasing a measurement accuracy. Commonly, the composite patterns are represented as the following Formula 62.

$$I_0(x,y) = \frac{G}{4}(2 + \cos(2\pi f_0 x) + \cos(2\pi f_0 x)) \quad \text{[Formula 62]}$$

And the rest of the composite patterns are represented as the following Formulas 63 and 64.

$$I_n(x,y) = \frac{G}{4}[2 + \cos(2\pi f_n x) + \cos(2\pi f_n y)] \quad \text{[Formula 63]}$$

$$f_i = f_0 - (f_0)^{(i-1)/(N-1)}, \quad 1 \leq i \leq N \quad \text{[Formula 64]}$$

wherein, $1 \leq n \leq N$, $N = 3, 4, 5$. N is the number of the composite patterns.

And a number of the composite patterns are scanned to the measurement object, and the detector 20 measures the shape of the reflected composite patterns.

FIG. 11 shows a method for extracting independent patterns in the first and second directions from a composite pattern through Fourier transform, by an independent pattern extraction part 31 in association with the second embodiment of the present disclosure. As shown in FIG. 11, the measured composite pattern is decomposed, through Fourier transform, into patterns in the vertical and horizontal directions concurrently with removing noise components due to the external noises. The Fourier transformed composite pattern is represented as the following Formula 65.

$$I(u,v) = A_0(u,v) + B_x \exp(u-f,v) + B^*_x \exp(u+f,v) + B_y \exp(u,v-f) + B^*_y \exp(u,v+f)$$ [Formula 65]

In Formula 65, x and y frequency components are decomposed, then being represented by the following Formulas 66 and 67.

$$\Theta_{0x}(u,v) = B_x \exp(u-f,v) + B^*_x \exp(u+f,v)$$ [Formula 66]

$$\Theta_{0y}(u,v) = B_y \exp(u-f,v) + B^*_y \exp(u+f,v)$$ [Formula 67]

And the respective patterns in the vertical direction (x-direction) and horizontal direction (y-direction) are decomposed through inverse Fourier transform, this then potentiating reconstruction thereof. In the same manner, as applying Fourier transform to a number of the composite patterns, acquired are the patterns for the vertical and horizontal directions as the following Formula 68.

$$\begin{cases} X_n(x,y) = |FFT^{-1}(\Theta_{nx}(u,v))| \\ Y_n(x,y) = |FFT^{-1}(\Theta_{ny}(u,v))| \end{cases}, 0 \leq n \leq N$$ [Formula 68]

And the wrapped phases by each pattern are provided through the aforesaid spatial-carrier frequency phase-shifting method. That is, phase values, $\Phi_{nwx}(x,y)$ and $\Phi_{nwy}(x,y)$ are obtained from the patterns of $X_n(x,y)$ and $Y_n(x,y)$.

And a method for acquiring unwrapped phases from wrapped phases is as below. Since the same procedures are proceeded in both of the patterns in the vertical direction (x-direction) and horizontal direction (y-direction), it is described only for the vertical direction.

At the very beginning, a phase difference between the highest frequency component and a frequency component lower than this is obtained as the following Formula 69. For reference, when n=0, the highest frequency component is provided.

$$\theta_{x,n-0} = \text{wrapToPi}[\Phi_{nwx}(x,y) - \Phi_{0wx}(x,y)]$$ [Formula 69]

$1 \leq n \leq N$ (N is the number of the used composite patterns, $3 \leq N \leq 5$)

wrapToPi is an operator as defined in the above.

Described are roughly 3 cases according to the number of the used composite patterns.

Case 1: using 3 composite patterns (N=3)

Step 1: performing phase unwrapping of $\theta_{x,2-0}$, using $\theta_{x,1-0}$, as the following Formula 70.

$$\theta_{ux,2-0} =$$ [Formula 70]
$$\text{round}\left[\frac{\theta_{x,1-0}(x,y)(f_0-f_2)/(f_0-f_1) - \theta_{x,2-0}(x,y)}{2\pi}\right]2\pi + \theta_{x,2-0}(x,y)$$

Step 2: performing phase unwrapping of $\Phi_{0wx}$, using $\theta_{ux,2-0}$, as the following Formula 71, so as to obtain phases.

$$\Phi_{0x} =$$ [Formula 71]
$$\text{round}\left[\frac{\theta_{ux,2-0}(x,y)(f_0-f_2) - \Phi_{0wx}(x,y)}{2\pi}\right]2\pi + \Phi_{0wx}(x,y)$$

Case 2: using 4 composite patterns (N=4)

Step 1: performing phase unwrapping of $\theta_{x,2-0}$, using $\theta_{x,1-0}$, as the following Formula 72.

$$\theta_{ux,2-0} = \text{round}\left[\frac{\theta_{x,1-0}(x,y)(f_0-f_2)/(f_0-f_1) - \theta_{x,2-0}(x,y)}{2\pi}\right]2\pi + \theta_{x,2-0}(x,y)$$ [Formula 72]

Step 2: performing phase unwrapping of $\theta_{x,3-0}$, using the phase values acquired in Formula 72, as the following Formula 73.

$$\theta_{ux,3-0} = \text{round}\left[\frac{\theta_{ux,2-0}(x,y)(f_0-f_3)/(f_0-f_2) - \theta_{x,3-0}(x,y)}{2\pi}\right]2\pi + \theta_{x,3-0}(x,y)$$ [Formula 73]

Step 3: performing phase unwrapping of $\Phi_{0wx}$, using $\theta_{ux,3-0}$, as the following Formula 74, so as to obtain phases.

$$\Phi_{0x} =$$ [Formula 74]
$$\text{round}\left[\frac{\theta_{ux,3-0}(x,y)(f_0-f_3) - \Phi_{0wx}(x,y)}{2\pi}\right]2\pi + \Phi_{0wx}(x,y)$$

Case 3: using 5 composite patterns (N=5)

Step 1: performing phase unwrapping of $\theta_{x,2-0}$, using $\theta_{x,1-0}$, as the following Formula 75.

$$\theta_{ux,2-0} = \text{round}\left[\frac{\theta_{x,1-0}(x,y)(f_0-f_2)/(f_0-f_2) - \theta_{x,2-0}(x,y)}{2\pi}\right]2\pi + \theta_{x,2-0}(x,y)$$ [Formula 75]

Step 2: performing phase unwrapping of $\theta_{x,3-0}$, using the phase values acquired in Formula 75, as the following Formula 76.

$$\theta_{ux,3-0} = \text{round}\left[\frac{\theta_{ux,2-0}(x,y)(f_0-f_3)/(f_0-f_2) - \theta_{x,3-0}(x,y)}{2\pi}\right]2\pi + \theta_{x,3-0}(x,y)$$ [Formula 76]

Step 3: performing phase unwrapping of $\theta_{x,4-0}$, using the phase values acquired in Formula 76, as the following Formula 77.

$$\theta_{ux,4-0} = \text{round}\left[\frac{\theta_{ux,3-0}(x,y)(f_0-f_4)/(f_0-f_3) - \theta_{x,4-0}(x,y)}{2\pi}\right]2\pi + \theta_{x,4-0}(x,y)$$ [Formula 77]

Step 4: performing phase unwrapping of $\Phi_{0wx}$, using $\theta_{ux,4-0}$, as the following Formula 78, so as to obtain phases.

$$\Phi_{0x} = \text{round}\left[\frac{\theta_{ux,A-0}(x, y)(f_0 - f_4) - \Phi_{0wx}(x, y)}{2\pi}\right]2\pi + \Phi_{0wx}(x, y) \quad \text{[Formula 78]}$$

As using the aforementioned methods, in the same manner, phase ($\Phi_{0y}$(x,y) for the pattern in the horizontal direction (y-direction pattern) is also acquired as the following Formula 79.

$$\begin{cases} \Phi_x(x, y) = \Phi_{0x}(x, y) \\ \Phi_y(x, y) = \Phi_{0y}(x, y) \end{cases} \quad \text{[Formula 79]}$$

The phases in the vertical and horizontal directions as described in the above are adopted to the deflectometry, so as to potentiate the real-time measurement of measurement objects having various shapes, such as freeform surfaces.

The invention claimed is:

1. A system for profile measurement based on high-speed deflectometry using composite patterns, the system comprising:
a composite pattern generation part configured to project, to a measurement object, a plurality of composite patterns having different frequencies for composite patterns generated by synthesizing a pattern in a first direction and a pattern in a second direction;
a detector configured to acquire images of a plurality of deformed composite patterns reflected from the measurement object; and
a phase acquisition part comprising:
an independent pattern extraction part and a regularization part;
a wrapped phase extraction part configured to extract wrapped phases for each of a plurality of patterns of the independent extraction part in the first direction from a plurality of spatial phase-shifting patterns moved in a pixel unit from regularized sine patterns of the regularization part, and wrapped phases for each of the plurality of patterns in the second direction;
an unwrapped phase acquisition part configured to acquire unwrapped phases for the patterns in the first direction based on a phase difference of the plurality of wrapped phases for the patterns in the first direction, and further configured to acquire unwrapped phases for the patterns in the second direction based on a phase difference of the plurality of the wrapped phases for the patterns in the second direction; and
an analyzing means configured to measure and analyze a 3D shape of the measurement object from the acquired unwrapped phases.

2. The system for profile measurement based on high-speed deflectometry using composite patterns according to claim 1, wherein a composite pattern is generated by synthesizing a pattern in the first direction, a pattern in the second direction, a pattern in a third direction rotated 45 degrees in a clockwise direction from the pattern in the second direction, and a pattern in a fourth direction rotated 45 degrees in a counterclockwise direction from the pattern in the second direction.

3. The system for profile measurement based on high-speed deflectometry using composite patterns according to claim 2, wherein the independent pattern extraction part is configured to decompose, through Fourier transform, each of the acquired images of the composite patterns into the respective independent patterns in the first direction and the second direction.

4. The system for profile measurement based on high-speed deflectometry using composite patterns according to claim 3, wherein the regularization part is configured to regularize the sine patterns for each of the independent patterns extracted by the independent pattern extraction part.

5. The system for profile measurement based on high-speed deflectometry using composite patterns according to claim 4, wherein the regularization part applies Lissajous figure and Ellipse fitting method to nonregularized sine pattern signals, so as to regularize the sine patterns.

6. The system for profile measurement based on high-speed deflectometry using composite patterns according to claim 5, wherein the wrapped phase extraction part is configured to obtain the plurality of spatial phase-shifting patterns moved in the pixel unit from the regularized sine patterns for each pattern in the first direction and the second direction, then configured to acquire phase shifts for each of the spatial phase shifting patterns, wherein the wrapped phases are thus extracted for each pattern in the first direction and the second direction therefrom.

7. The system for profile measurement based on high-speed deflectometry using composite patterns according to claim 6, wherein the unwrapped phase acquisition part is configured to acquire unwrapped phases for patterns in the first direction and the second direction by obtaining one cycle of phases for the patterns in the first direction and the second direction.

8. A method of profile measurement based on high-speed deflectometry using composite patterns, the method comprising:
projecting, by a composite generation part, to a measurement object, a plurality of composite patterns having different frequencies for the composite patterns generated by synthesizing a pattern in a first direction and a pattern in a second direction;
acquiring, by a detector, a plurality of deformed composite patterns reflected from the measurement object;
providing an independent extraction part and a regularization part;
extracting, by a wrapped phase extraction part, wrapped phases for each of a plurality of patterns of the independent extraction part in the first direction from a plurality of spatial phase-shifting patterns moved in a pixel unit from regularized sine patterns of the regularization part, and wrapped phases for each of the plurality of patterns in the second direction;
acquiring, by an unwrapped phase acquisition part, unwrapped phases for the patterns in the first direction based on a phase difference of the plurality of wrapped phases for the patterns in the first direction, and further configured to acquire unwrapped phases for the patterns in the second direction based on a phase difference of the plurality of the wrapped phases for the patterns in the second direction; and
measuring and analyzing, by an analyzing means, a 3D shape of the measurement object from the acquired phases.

9. The method of profile measurement based on high-speed deflectometry using composite patterns according to claim 8, wherein the method comprises:
decomposing, by the independent pattern extraction part, through Fourier transform, each of the acquired images of the composite patterns into the respective independent patterns in the first direction to the fourth direction; and regularizing, by the regularization part, the sine patterns for each of the independent patterns extracted by the independent pattern extraction part.

10. The method of profile measurement based on high-speed deflectometry using composite patterns according to claim 9, wherein regularizing applies Lissajous figure and Ellipse fitting method to nonregularized sine pattern signals, so as to regularize sine patterns.

11. A system for profile measurement based on high-speed deflectometry using composite patterns, the system comprising:
  a composite pattern generation part configured to project, to a measurement object, a plurality of composite patterns having different frequencies for composite patterns generated by synthesizing a pattern in a first direction and a pattern in a second direction;
  a detector configured to acquire images of a plurality of deformed composite patterns reflected from the measurement object;
  a phase acquisition part comprising:
    an independent pattern extraction part configured to decompose, through Fourier transform, each of the acquired images of the plurality of composite patterns into each independent pattern of the plurality of patterns in the first direction and the second direction;
    a regularization part configured to regularize sine patterns for the plurality of the patterns in the first direction and the second direction extracted by the independent pattern extraction part;
    a wrapped phase extraction part configured to extract wrapped phases for each of the plurality of patterns in the first direction from a plurality of spatial phase-shifting patterns moved in a pixel unit from the regularized sine patterns and wrapped phases for each of the plurality of patterns in the second direction; and
    an unwrapped phase acquisition part configured to acquire unwrapped phases for the patterns in the first direction based on a phase difference of the plurality of wrapped phases for the patterns in the first direction, and configured to acquire unwrapped phases for the patterns in the second direction based on a phase difference of the plurality of wrapped phases for the patterns in the second direction; and
  an analyzing means configured to measure and analyze, a 3D shape of the measurement object from the acquired phases.

12. A method of profile measurement based on high-speed deflectometry using composite patterns, the method comprising:
  projecting, by a composite pattern generation part, to a measurement object, a plurality of composite patterns having different frequencies for composite patterns generated by synthesizing a pattern in a first direction and a pattern in a second direction;
  acquiring, by a detector, images of a plurality of deformed composite patterns reflected from the measurement object;
  decomposing, by an independent pattern extraction part, through Fourier transform method, each of the acquired images of the plurality of composite patterns into each independent pattern of the plurality of patterns in the first direction and the second direction;
  regularizing, by a regularization part, sine patterns for the plurality of the patterns in the first direction and the second direction extracted by the independent pattern extraction part;
  extracting, by a wrapped phase extraction part, wrapped phases for each of the plurality of patterns in the first direction from a plurality of spatial phase-shifting patterns moved in a pixel unit from the regularized sine patterns and wrapped phases for each of the plurality of patterns in the second direction;
  acquiring, by an unwrapped phase acquisition part, unwrapped phases for the patterns in the first direction based on a phase difference of the plurality of wrapped phases for the patterns in the first direction, and acquiring unwrapped phases for the patterns in the second direction based on a phase difference of the plurality of the wrapped phases for the patterns in the second direction; and
  measuring and analyzing, by an analyzing means, a 3D shape of the measurement object from the acquired phases.

13. The system for profile measurement based on high-speed deflectometry using composite patterns according to claim 1, wherein the first direction is a vertical direction and the second direction is a horizontal direction.

14. The method of profile measurement based on high-speed deflectometry using composite patterns according to claim 8, wherein the first direction is a vertical direction and the second direction is a horizontal direction.

15. The system for profile measurement based on high-speed deflectometry using composite patterns according to claim 11, wherein the first direction is a vertical direction and the second direction is a horizontal direction.

16. The method of profile measurement based on high-speed deflectometry using composite patterns according to claim 12, wherein the first direction is a vertical direction and the second direction is a horizontal direction.

* * * * *